United States Patent
Bretschneider

(10) Patent No.: US 12,362,166 B2
(45) Date of Patent: Jul. 15, 2025

(54) CATHODE-RAY TUBE ULTRAVIOLET LIGHT SOURCE

(71) Applicant: Eric C. Bretschneider, Flower Mound, TX (US)

(72) Inventor: Eric C. Bretschneider, Flower Mound, TX (US)

(*) Notice: Subject to any disclaimer, the term of this patent is extended or adjusted under 35 U.S.C. 154(b) by 0 days.

(21) Appl. No.: 18/688,334

(22) PCT Filed: Aug. 31, 2022

(86) PCT No.: PCT/US2022/042180
§ 371 (c)(1),
(2) Date: Feb. 29, 2024

(87) PCT Pub. No.: WO2023/034399
PCT Pub. Date: Mar. 9, 2023

(65) Prior Publication Data
US 2025/0125138 A1   Apr. 17, 2025

Related U.S. Application Data

(60) Provisional application No. 63/239,138, filed on Aug. 31, 2021.

(51) Int. Cl.
*H01J 63/06*   (2006.01)
*H01J 63/02*   (2006.01)

(52) U.S. Cl.
CPC ............. *H01J 63/06* (2013.01); *H01J 63/02* (2013.01)

(58) Field of Classification Search
CPC ................................. H01J 63/06; H01J 63/02
See application file for complete search history.

(56) References Cited

U.S. PATENT DOCUMENTS

| | | | |
|---|---|---|---|
| 9,766,666 B1* | 9/2017 | Asrani | H04B 5/79 |
| 2002/0006729 A1* | 1/2002 | Geiger | H01L 21/31625 |
| | | | 257/E21.243 |
| 2002/0190643 A1* | 12/2002 | Cummings | C09K 11/642 |
| | | | 313/553 |
| 2003/0076423 A1* | 4/2003 | Dolgoff | H04N 13/305 |
| | | | 348/E13.058 |
| 2006/0063459 A1* | 3/2006 | Iba | H01J 31/127 |
| | | | 445/3 |
| 2007/0098029 A1* | 5/2007 | LeBoeuf | H01S 3/0959 |
| | | | 372/39 |
| 2011/0222267 A1* | 9/2011 | Park | G09F 13/14 |
| | | | 362/97.1 |

* cited by examiner

*Primary Examiner* — Mary Ellen Bowman
(74) *Attorney, Agent, or Firm* — TIPS Group

(57) ABSTRACT

A cathode-ray tube ultraviolet light source includes a metal housing provided with a light-transmissive window, a heatsink disposed within the metal housing, a phosphor having a first surface and an opposing second surface, wherein the second surface of the phosphor is in thermal contact with the heatsink, and an electron gun capable of developing an electron beam to impinge upon the first surface of the phosphor, whereby light emitted from the second surface of the phosphor is directed through the light-transmissive window.

17 Claims, 5 Drawing Sheets

CATHODE-RAY TUBE ULTRAVIOLET LIGHT SOURCE

BACKGROUND

Ultraviolet (UV) light is a form of electromagnetic radiation with wavelengths from about 10 nanometers (nm) to 400 nm. UV light has a shorter wavelength than visible light, but longer than X-rays. Short wave ultraviolet light damages DNA and sterilizes surfaces with which it comes into contact. For humans, suntan and sunburn are familiar effects of exposure of the skin to UV light, along with increased risk of skin cancer.

There are no natural sources of UV light below about 280 nm due to atmospheric absorption. This includes the UVC spectrum of 190 nm to 280 nm, which can be used for disinfection because UVC light is strongly absorbed by nucleic acids which can damage DNA and RNA. However, since mammalian DNA is confined to the nucleus of cells, proteins in the cell's cytoplasm effectively shield mammalian nucleus DNA from <230 nm UV light. Therefore, a UVC light source with a wavelength from 190-230 nm is effective at sterilizing surfaces without posing a danger to humans in the vicinity. Below 190 nm a UV light would produce significant amounts of ozone, which have been known to have deleterious effects on humans.

Due to atmospheric absorption of light below about 280 nm, this portion of the spectrum is also known as the solar blind spectrum. Due to atmospheric absorption UV light with a wavelength<280 nm has a limited range of transmission and is also efficiently scattered by aerosols and molecules in air. Because of these factors, light with a wavelength<280 nm may also be used for non-line of sight (NLOS) covert communication systems.

Low pressure mercury vapor lamps have been used to produce UVC light for sterilization. Such lamps are energy efficient and cost effective but suffer from their use of mercury, which is an environmental hazard and can be toxic to humans. There has been a movement away from the use of low pressure mercury vapor lamps in recent years due to environmental and health concerns.

Light Emitting Diodes have also been used to produce UVC light. While they do not include mercury or other heavy metals, they are not very efficient and are relative low capacity compared to other UVC light technologies.

Pulsed Xenon lamps produce a wide spectrum of UV light but are relatively expensive compared to other technologies. Since the spectrum of UV is so wide, the output of the lamps need to be filtered to attenuate wavelengths outside of the 190-230 nm range.

These and other limitations of the prior art will become apparent to those of skill in the art upon a reading of the following descriptions and a study of the several figures of the drawing.

SUMMARY

A cathode-ray tube ultraviolet light source includes a metal housing provided with a light-transmissive window, a heatsink disposed within the metal housing, a phosphor having a first surface and an opposing second surface, wherein the second surface of the phosphor is in thermal contact with the heatsink, and an electron gun capable of developing an electron beam to impinge upon the first surface of the phosphor, whereby light emitted from the second surface of the phosphor is directed through the light-transmissive window. In certain embodiments a reflector is disposed within the metal housing to direct the light emitted from the first surface towards the light-transmissive window.

A method for operating a cathode-ray tube ultraviolet light source includes directing an electron beam to a first surface of a phosphor that has a second surface in thermal contact with a heatsink; and reflecting light emitted from the second surface of the phosphor through a light-transmissive window. In certain embodiments the electron beam focus and/or a scanning of the electron beam on the first surface of the phosphor are used to vary the angular emission characteristics of the light emitted by the light source. In another embodiment multiple phosphors are used to also vary the spectral characteristics of the emitted light.

Advantages of various embodiments are that UVC light can be produced in an efficient, cost-effective manner without the use of dangerous and environmentally unfriendly heavy metals such as mercury.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
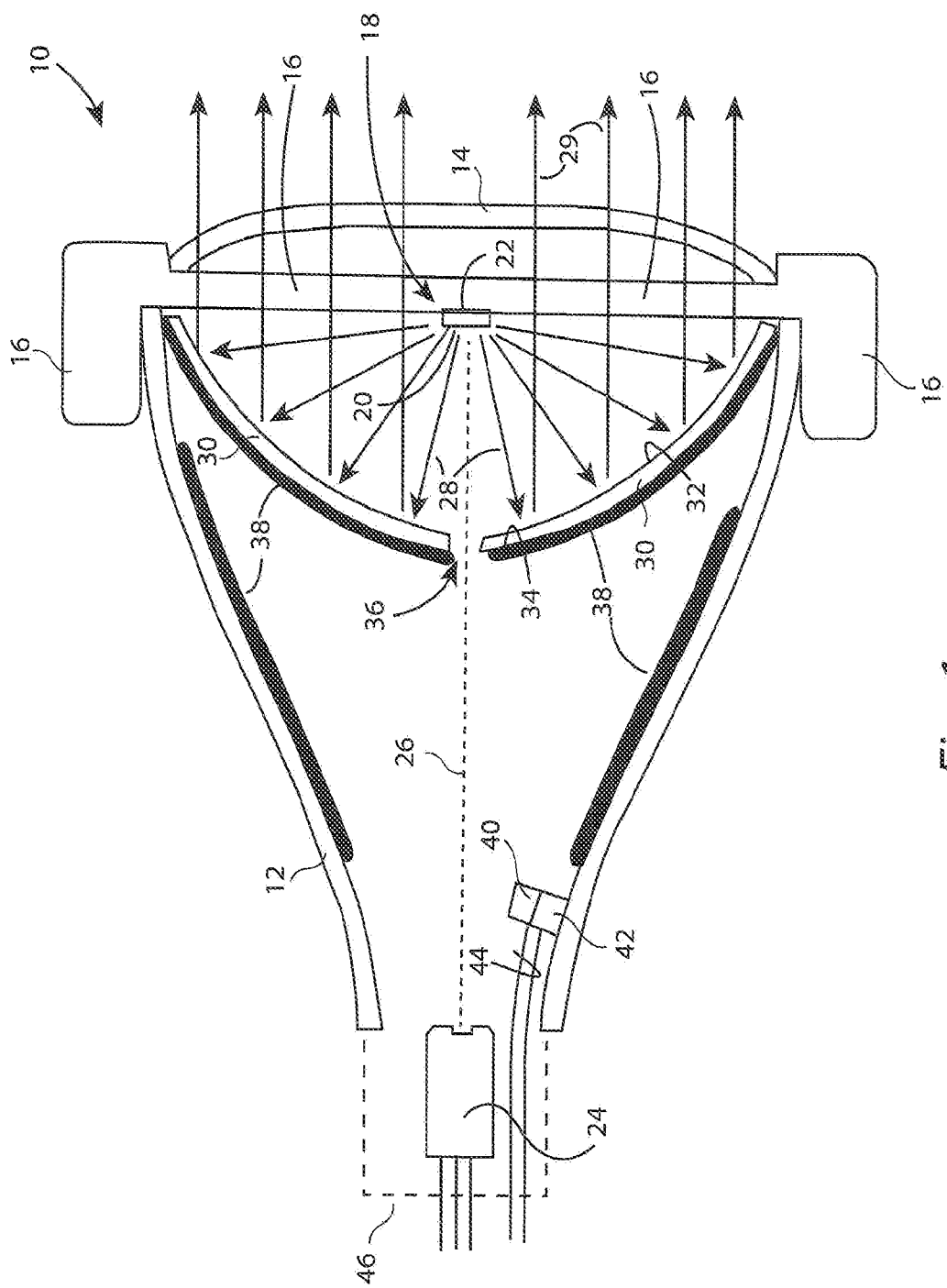
FIG. 1 is a first example embodiment of a cathode-ray tube ultraviolet light source.

FIG. 1 is a first example embodiment of a cathode-ray tube ultraviolet light source 10 and includes a metal housing 12 provide with a light-transmissive (e.g. transparent) window 14, a heatsink 16, a phosphor 18 having a first surface 20 and an opposing second surface 22 in thermal contact with the heatsink 16, and an electron source or "gun" 24 capable of developing an electron beam 26 to impinge upon the first surface 20 of the phosphor 18. Light 28 emitted from the first surface 20 of the phosphor is directed through the light-transmissive window 14 as emitted light 29 by a reflector 30 including a first surface 32, a second surface 34 and an aperture 36 through which the electron beam 26 can pass. The light source is under vacuum so as not to impede the electron beam 26 and to prolong the life of the components of the light source.

In this first example embodiment, reflector 30 is parabolic with a reflective aluminum film provided on the first surface 32. A getter material 38 is applied as a film to the second surface 34 of the reflector 30 and inside portions of the metal housing 12. By designing the mirror such that the phosphor 18 is positioned at the focus of the reflector 30, the emitted UV light 29 becomes collimated as shown.

The metal housing 12 takes the place of the typical glass envelope of a cathode-ray tube (CRT). It is advantageous in that it provides shielding of, for example, X-rays generated by the impact the electron beam 26 on the phosphor 18 and because it can be considerably thinner and more durable than a glass envelope. It is therefore safer in that it reduces the chance of implosion of the envelope. The metal housing 12 is preferably at least partially coated with a non-conductive material to reduce the chance of ground faults and to provide a non-conductive surface for the attachment of additional circuitry and devices. For example, the metal housing 12 can include porcelain coated steel or a polymer coated steel. Other metals and metal alloys are also suitable for use in the metal housing.

The light-transmissive window 14 can be conveniently made from vitreous quartz, which is readily available and reasonable in price. Other materials that are suitable include magnesium fluoride glass and calcium fluoride glass. For high-end applications, flat sapphire is also suitable. Preferably the light-transmissive window is highly transparent to 190-230 nm wavelengths.

The heatsink 16, in this example embodiment, formed as a flange or frame to connect the light transmissive window 14 to the rest of the metal housing 12. As such, a portion of the heatsink 16 extends outside of the metal envelope 12 and a portion, in the form of a web of material, extends across the inside of the metal housing 12 to provide a support for the phosphor 18. Heat generated by the impingement of the electron beam 26 on the phosphor 18 therefore is transferred to the heat sink 16 and thermally conducted outside of the metal housing 12 to be dissipated by convection and radiation into the ambient environment. The metal housing 12 also serves as a heatsink to remove excess heat from the light source 10.

Figure 1A:
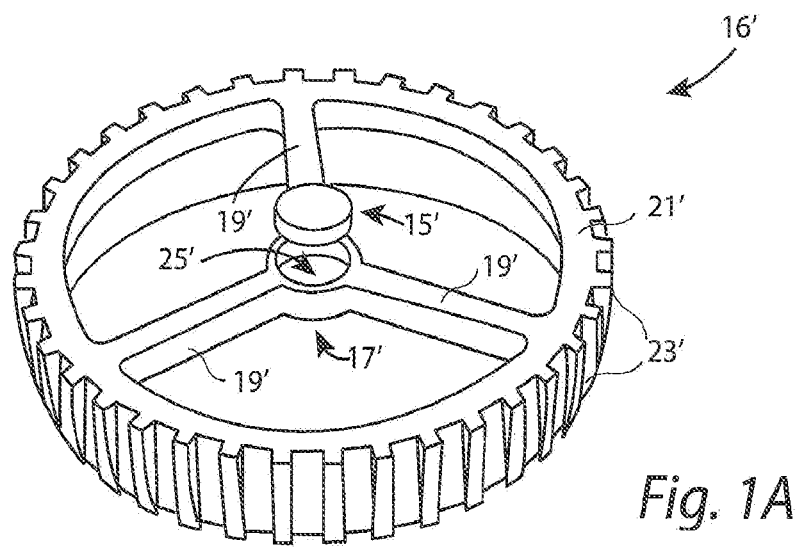
FIG. 1A is a perspective view of an example heatsink with a radiation shield.

In FIG. 1A, an example heatsink 16' and a supplemental radiation shield 15' is shown. The example heatsink 16' is wheel-shaped and includes a central hub 17', three radial spokes 19' and a circular rim 21' provided with a number of heat fins 23'. The heatsink 16' is designed to be sandwiched between, for example, the metal housing 12 and the light-transmissive window 14 of FIG. 1, forming a high-pressure seal with suitable gaskets (not shown). The radiation shield 15' fits into a recess 25' of the hub 17' and is preferably held in place with a thermally conductive adhesive and/or mechanically. Heat caused by the impingement of the electron beam on the phosphor (not shown in this figure) can be thermally conducted from the hub 17', through the radial arms 19' and out to the heat fins 23' of rim 21'. The radiation shield 15' is preferably made from a dense metal such as molybdenum to increase radiation shielding for high-energy emissions of the phosphor such as x-rays.

With continuing reference to FIG. 1, and as noted previously, a getter material 38 is preferably provided within the UV light source 10, e.g. on portions of the reflector 30 and at least some of the inside surfaces of the metal housing 12. The getter can be, for example, barium or a barium alloy, and is provided to remove gaseous contaminants from within the metal housing. Typically, the getter is applied after the light source 10 is under vacuum, such as by the evaporative heating of a disc or ring of barium 40 by a resistive heater 42. The wires 44 for the resistive heater 42 can extend through an end-plug 46, made for example from glass, as pins. Other pins through the end-plug 46 can be used to power and control the electron source 24 and/or other internal components of the UV light source 10.

Figure 2:
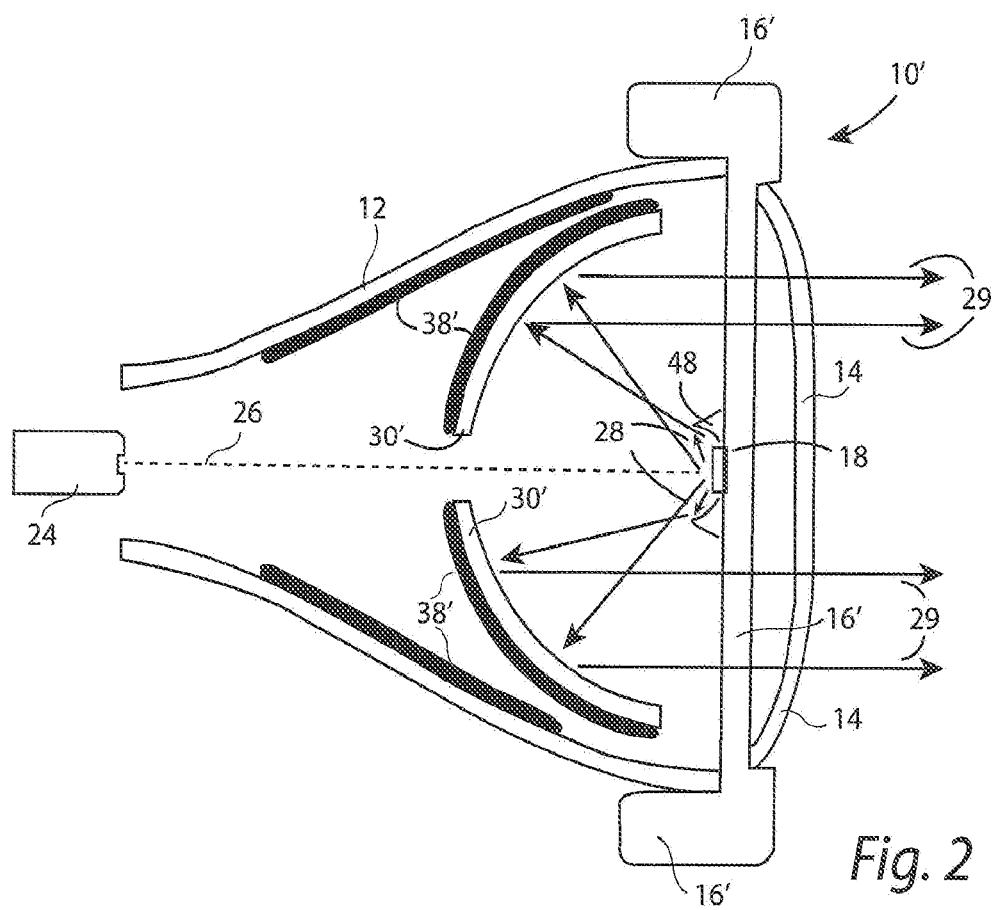
FIG. 2 is a second example embodiment of a cathode-ray tube ultraviolet light source.

FIG. 2 is a second example embodiment of a cathode-ray tube ultraviolet light source 10' which is similar to the first example light source 10, where like reference numerals refer to like components or elements. The major difference between the embodiments of FIGS. 1 and 2 is that a heatsink 16' includes a primary reflector portion 48 which focusses the emitted light 28 on a secondary reflector 30' before passing through the window 14 as emitted light 29. This allows the secondary reflector 30' to be of a smaller diameter than reflector 30.

Figure 3:
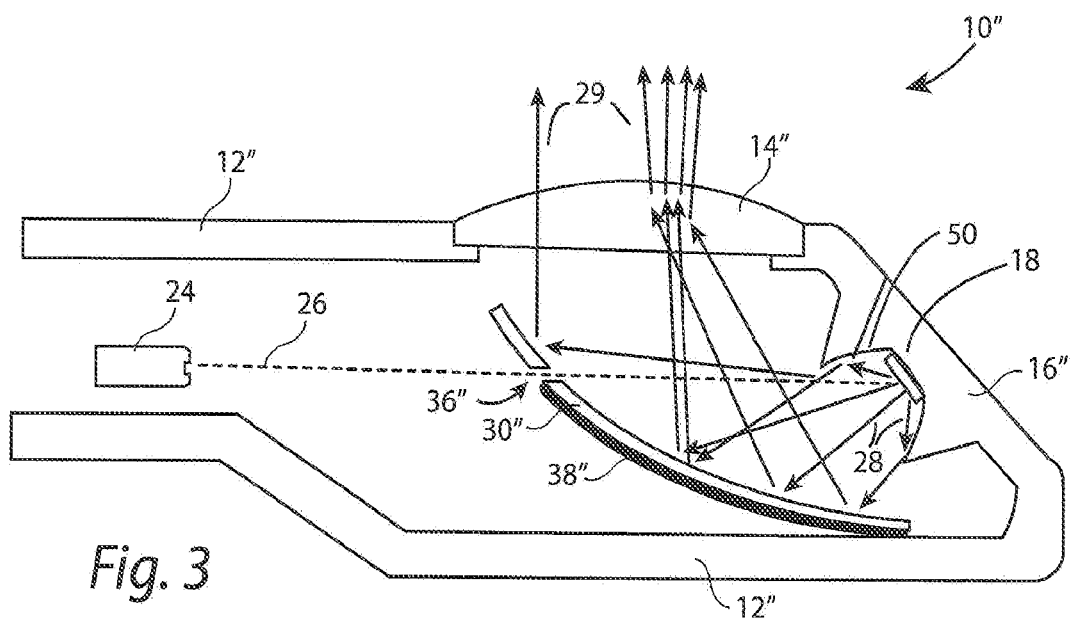
FIG. 3 is a third example embodiment of a cathode-ray tube ultraviolet light source.

FIG. 3 is a third example embodiment of a cathode-ray tube ultraviolet light source 10" which has an off-axis emission of UV light 29, where like reference numerals to those used with respect to FIGS. 1 and 2 refer to like components or elements. In this embodiment, the electron beam 26 of electron gun 24 passes through an aperture 36" of a reflective optic 30" to impinge upon a phosphor 18 of a heatsink 16" which forms a part of a substantially metal housing 12". The heatsink 16" has a section 50 which serves as a reflective optic to direct the UV light 28 emitted by the phosphor towards the reflective optic 30" and, from there out of window 14". It should be noted that the window 14" may serve as a refractive optic to help collimate or otherwise shape the emitted light 29, which is at approximately right angles to the electron beam 26 in this example.

Figure 4:
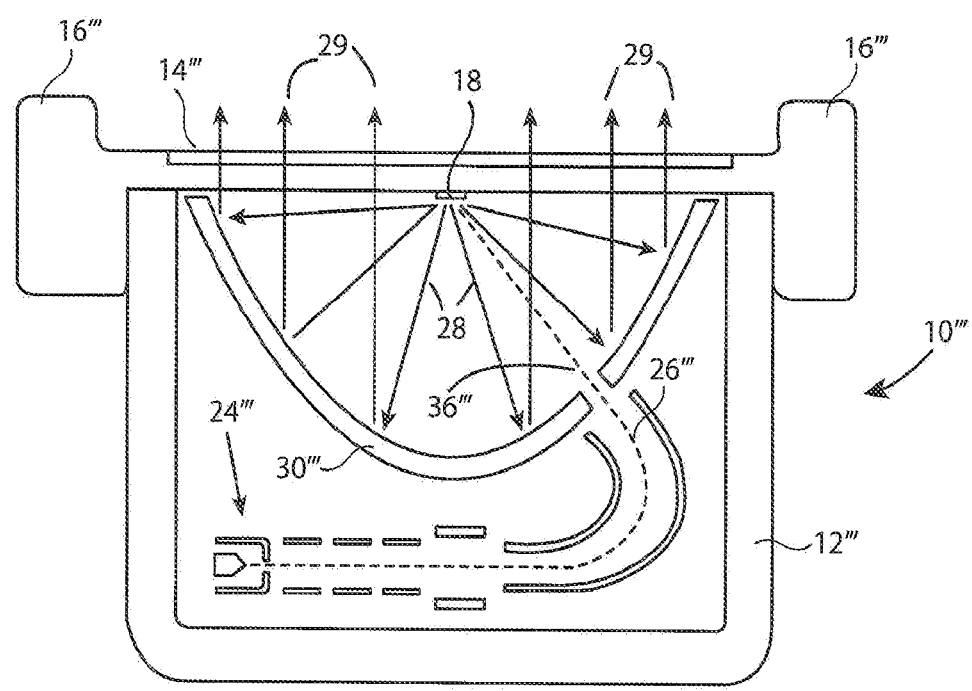
FIG. 4 is a fourth example embodiment of a cathode-ray tube ultraviolet light source.

FIG. 4 is a fourth example embodiment of a cathode-ray tube ultraviolet light source 10''' with the notable change of an electron gun 24''' and a curved path for the electron beam 26''', where like reference numerals refer to like components in the previously described embodiments. This fourth example embodiment provides a compact electron source with a bent beam path to reduce the overall size of the metal housing 12'''. In this embodiment a series of focusing and deflecting apparatus bends the electron beam 26''' so that it passes through an aperture 36''' of reflector 30''' at an angle to impinge upon the phosphor 18. The UV light emitted by the phosphor 18 is reflected by reflector 30''' through a transparent window 14''' supported by a heat sink 16''' as emitted light 29.

Figure 5:
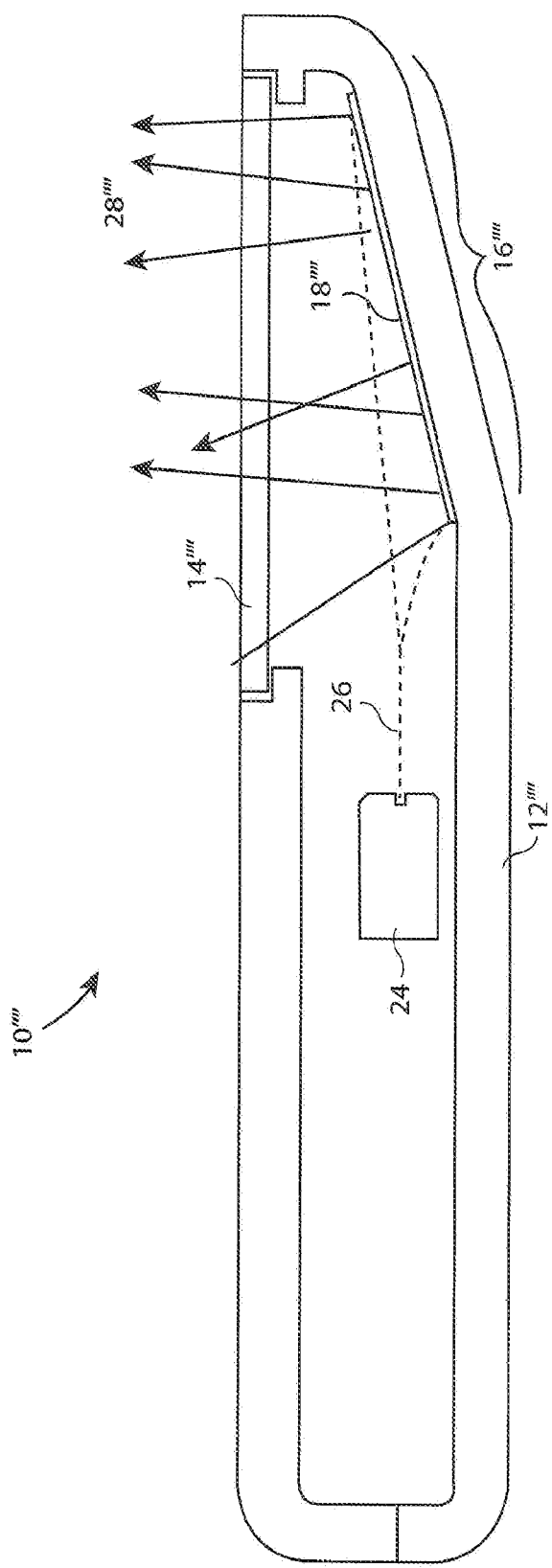
FIG. 5 is a fifth example embodiment of a cathode-ray tube ultraviolet light source.

FIG. 5 is a fifth example embodiment of a cathode-ray tube ultraviolet light source 10'''' having a metal housing 12'''' with a heatsink section 16''''. In this embodiment, the electron gun 24 produces an electron beam 26 which impinges on phosphor 18'''' at an angle such that light 28'''' is emitted through a window 14''''. It should be noted that this is the first embodiment that does not use a reflector to redirect or collimate the light 28'''' emitted by the phosphor 18''''. However, this example embodiment is simple in design and can be less expensive to produce that certain ones of the other example embodiments.

The emission wavelength of a light source 10 is determined by the phosphor material being irradiated. For example, AlN is a material that can emit UVC light at 210 nm. As another example, AlGaN can emit at different (longer) wavelengths. For AlGaN, the amount of gallium will determine the emission wavelength which will increase with the amount of gallium added to the alloy. Furthermore, dopants can be added to AlN or AlGaN to change their emission wavelengths. As still another example, hexagonal boron nitride will emit UVC light in the range of 210-220 nm.

Other phosphor materials that emit UV light in the range of 190-280 nm include:

$LuF_3$: Nd $Sr(Al,Mg)_{12}O_{19}$:Pr $Ca_2Al_2SiZO_7$:Pr
$YSiO_5$:Pr
$Lu_2SiO_5$:Pr
$Ca_2P_2O_7$:Pr
$LaPO_4$:Pr
$(Lu,Y,Sc)_3(Al,Ga)_5O_{12}$
$(Lu,Y,Sc)(Al,Ga)O_3$:Pr
$(Y,Lu)_3(Al,Ga)_5O_{12}$:La
$YBO_3$:Pr
$Sr_3Y_2Si_6O_{18}$:Pr

Preferred electron beam energy is 6,000 to 34,000 V. Beam current can range from 1 pA to 5 mA. For many applications, a spot size in the range of 0.1 to 1.0 mm diameter is suitable. For other applications, a spot size of up to 5 mm diameter may be suitable.

Since the human visual system is incapable of detecting light in with a wavelength less than about 360 nm, in some embodiments a phosphor material that emits in the wavelength range of about 450 nm to about 650 nm may be incorporated with a phosphor material that emits in the wavelength range of about 190 nm to about 280 nm in order to provide a visual indication that the device is operating.

Figure 6:
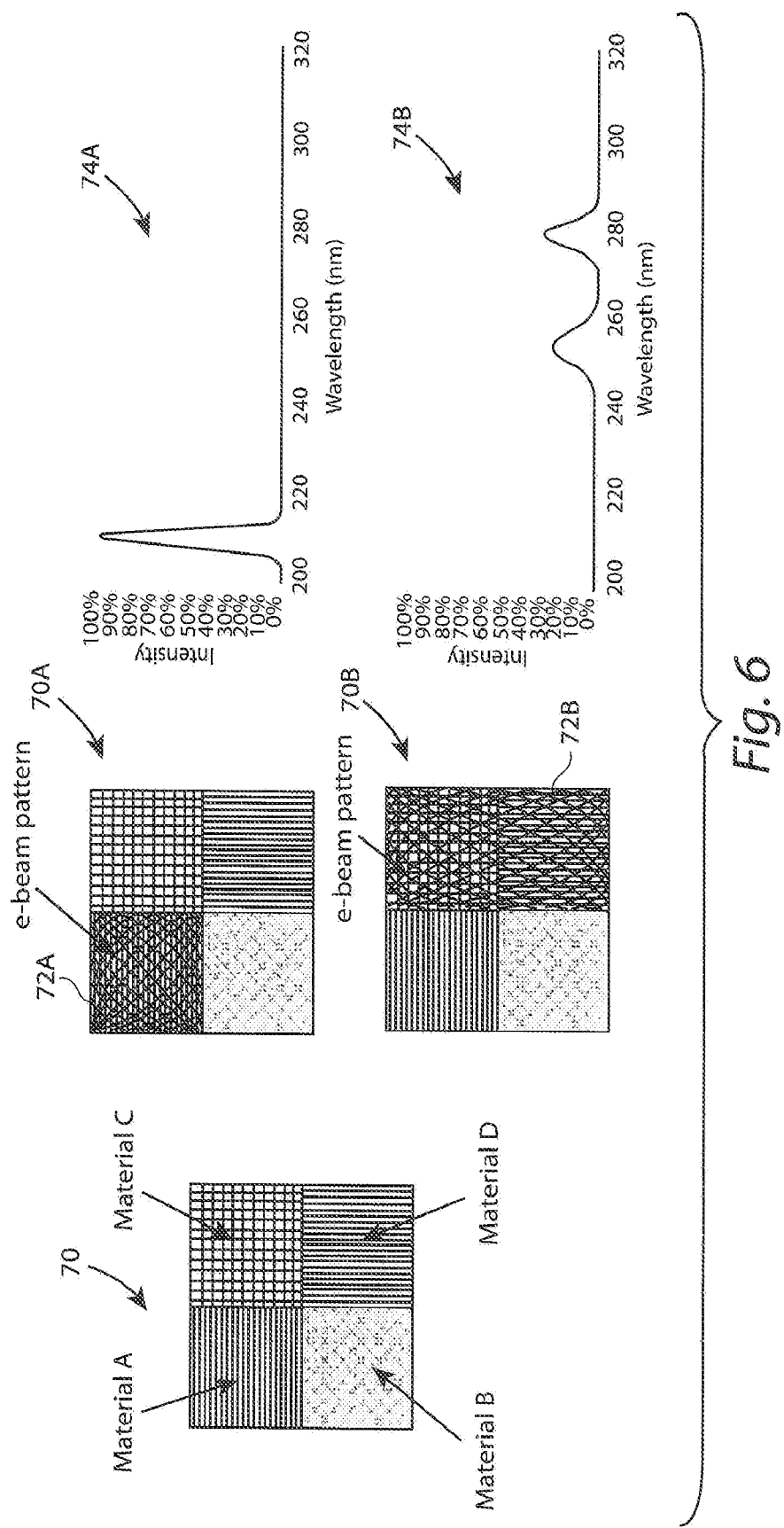
FIG. 6 illustrates a first spectral tuning method for a cathode-ray tube ultraviolet light source using a plurality of phosphors.

FIG. 6 illustrates a first spectral tuning method for a cathode-ray tube ultraviolet light source using a plurality of phosphors. In this example four different phosphors are laid out in a 2×2 grid 70 and comprise a Material A, Material B, Material C and Material D. As seen at 70A, a "spirograph" type electron beam ("e-beam") pattern 72A over Material A produces an emission spectra 74A. As seen at 70B, a spirograph type e-beam pattern 72B over Material C and Material D produces a different emission spectra 74B.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A cathode-ray tube ultraviolet light source comprising:
an evacuated metal housing provided with a light-transmissive window;
a heatsink disposed within the metal housing;
a getter material disposed within the metal housing;
a phosphor having a first surface and an opposing second surface, wherein the second surface of the phosphor is in thermal contact with the heatsink;
an electron gun capable of developing an electron beam to impinge upon the first surface of the phosphor;
whereby light emitted from the first surface of the phosphor is directed through the light-transmissive window and has a wavelength in the range of 190-230 nm.

2. A cathode-ray tube ultraviolet light source as recited in claim 1 further comprising a reflector disposed within the metal housing to direct the light emitted from the first surface of the phosphor through the light-transmissive window.

3. A cathode-ray tube ultraviolet light source as recited in claim 2 wherein the reflector collimates the light directed through the light-transmissive window.

4. A cathode-ray tube ultraviolet light source as recited in claim 3 wherein the reflector is parabolic with a focal point on the phosphor.

5. A cathode-ray tube ultraviolet light source as recited in claim 4 wherein the reflector is provided with an aperture to permit the passage of the electron beam.

6. A cathode-ray tube ultraviolet light source as recited in claim 1 wherein the metal housing comprises a metal at least partially coated with a non-conductive material.

7. A cathode-ray tube ultraviolet light source comprising:
an evacuated metal housing provided with a light-transmissive window, wherein the metal housing comprises a metal at least partially coated with a non-conductive material forming a porcelain coated steel;
a heatsink disposed within the metal housing;
a getter material disposed within the metal housing;
a phosphor having a first surface and an opposing second surface, wherein the second surface of the phosphor is in thermal contact with the heatsink;
an electron gun capable of developing an electron beam to impinge upon the first surface of the phosphor;
whereby light emitted from the first surface of the phosphor is directed through the light-transmissive window.

8. A cathode-ray tube ultraviolet light source as recited in claim 6 wherein the metal housing comprises polymer coated steel.

9. A cathode-ray tube ultraviolet light source comprising:
an evacuated metal housing provided with a light-transmissive window, wherein the light-transmissive window comprises a least one of quartz, magnesium fluoride, calcium fluoride and sapphire;
a heatsink disposed within the metal housing;
a getter material disposed within the metal housing;
a phosphor having a first surface and an opposing second surface, wherein the second surface of the phosphor is in thermal contact with the heatsink;
an electron gun capable of developing an electron beam to impinge upon the first surface of the phosphor:
whereby light emitted from the first surface of the phosphor is directed through the light-transmissive window.

10. A cathode-ray tube ultraviolet light source as recited in claim 1 wherein the heatsink comprises a part of the metal housing adjacent the light-transmissive window.

11. A cathode-ray tube ultraviolet light source as recited in claim 2 wherein the getter material is provided on a portion of the reflector.

12. A cathode-ray tube ultraviolet light source as recited in claim 1 wherein a portion of the heatsink adjacent the phosphor is configured as a reflector.

13. A cathode-ray tube ultraviolet light source as recited in claim 1 further comprising a focusing mechanism for the electron beam disposed within the metal housing.

14. A cathode-ray tube ultraviolet light source comprising:
an evacuated metal housing provided with a light-transmissive window;
a heatsink disposed within the metal housing;
a getter material disposed within the metal housing;
a phosphor having a first surface and an opposing second surface, wherein the second surface of the phosphor is in thermal contact with the heatsink;
an electron gun capable of developing an electron beam to impinge upon the first surface of the phosphor; and
a deflection mechanism for the electron beam disposed within the metal housing;
whereby light emitted from the first surface of the phosphor is directed through the light-transmissive window.

15. A cathode-ray tube ultraviolet light source as recited in claim 1 further comprising a resistive heater for evaporating a getter material disposed within the metal housing.

16. A cathode-ray tube ultraviolet light source as recited in claim 1 wherein the phosphor is one of a plurality of phosphors in thermal contact with the heatsink.

17. A cathode-ray tube ultraviolet light source as recited in claim 1 further comprising a non-conductive base provided with a plurality of conductive pins extending into the metal housing.

* * * * *